(12) United States Patent
Liu et al.

(10) Patent No.: US 9,772,040 B2
(45) Date of Patent: Sep. 26, 2017

(54) FAUCET WITH TWO OUTLETS

(71) Applicant: Xiamen Runner Industrial Corporation, Xiamen (CN)

(72) Inventors: Hui-Ming Liu, Xiamen (CN); Feng Lin, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 15/003,840

(22) Filed: Jan. 22, 2016

(65) Prior Publication Data

US 2016/0305101 A1 Oct. 20, 2016

(30) Foreign Application Priority Data

Apr. 18, 2015 (CN) ..................... 2015 2 0238279 U

(51) Int. Cl.
*F16K 11/078* (2006.01)
*F16K 35/02* (2006.01)
*F16K 11/074* (2006.01)

(52) U.S. Cl.
CPC ...... *F16K 11/0787* (2013.01); *F16K 11/0743* (2013.01); *F16K 35/025* (2013.01); *E03C 2201/30* (2013.01); *E03C 2201/40* (2013.01); *Y10T 137/7256* (2015.04); *Y10T 137/86823* (2015.04); *Y10T 137/86863* (2015.04); *Y10T 137/87579* (2015.04); *Y10T 137/9464* (2015.04)

(58) Field of Classification Search
CPC ..... Y10T 137/86533; Y10T 137/86823; Y10T 137/87571; Y10T 137/87579; Y10T 137/87652; Y10T 137/8766; Y10T 137/87668; Y10T 137/9464; Y10T 137/7069; Y10T 137/7256; Y10T 137/86863; F16K 11/072; F16K 11/074; F16K 11/0743; F16K 11/078; F16K 11/0782; F16K 11/0787; F16K 19/006; F16K 35/025; F16K 35/022; F16K 35/027; F16K 35/00; E03C 2201/40; E03C 2201/30; E03C 1/04
USPC ............................................ 251/89–116, 297
See application file for complete search history.

(56) References Cited

U.S. PATENT DOCUMENTS

| | | | |
|---|---|---|---|
| 557,943 A | * | 4/1896 | Bayley .................. F16K 35/025 251/110 |
| 643,617 A | * | 2/1900 | Anderson ............. F16K 35/025 251/110 |

(Continued)

*Primary Examiner* — Mary McManmon
*Assistant Examiner* — David Colon Morales
(74) *Attorney, Agent, or Firm* — Chun-Ming Shih

(57) ABSTRACT

A faucet with two outlets includes a main body, an outlet pipe, a hot water inlet conduit, a cold water inlet conduit, a cold water conduit, a filtered water conduit and a switch member. The outlet pipe has an inner channel and an outer channel. Filtered water flows through the inner channel, running water flows through the outer channel. The switch member laterally formed a peripheral wall of the main body, and having a valve core being mounted inside the main body. The valve core has control filtered water or running water outlet from the outlet pipe. The faucet with two outlets respectively outputs filtered water and running water through two different waterways in the outlet pipe and ensures simple structure, convenient operation and multiple water output modes.

4 Claims, 8 Drawing Sheets

(56) References Cited

U.S. PATENT DOCUMENTS

| | | | | |
|---|---|---|---|---|
| 961,466 | A * | 6/1910 | Shade | F16K 11/0743 137/625.21 |
| 1,043,281 | A * | 11/1912 | Wilton | F16K 35/025 251/105 |
| 1,121,024 | A * | 12/1914 | Knezek | F16K 35/025 251/110 |
| 1,344,704 | A * | 6/1920 | Martin | F16K 35/025 251/110 |
| 1,743,685 | A * | 1/1930 | Platt | F16K 35/025 251/109 |
| 2,064,623 | A * | 12/1936 | Mueller | F16K 35/027 251/81 |
| 2,899,841 | A * | 8/1959 | Melloy | G05G 1/12 192/46 |
| 3,679,170 | A * | 7/1972 | Bernas | F16K 35/06 251/104 |
| 3,911,956 | A * | 10/1975 | LeBreton | F16K 11/0743 137/625.46 |
| 4,137,945 | A * | 2/1979 | Cutts | F16K 5/10 137/625.46 |
| 4,549,716 | A * | 10/1985 | Warren | F16K 31/60 192/69.91 |
| 4,611,757 | A * | 9/1986 | Saether | G05D 23/1393 137/625.41 |
| 4,653,538 | A * | 3/1987 | Tsutsui | F16K 11/0746 137/597 |
| 4,794,952 | A * | 1/1989 | Burkard | F16K 11/074 137/597 |
| 5,205,313 | A * | 4/1993 | Moretti | F16K 35/14 137/112 |
| 5,213,136 | A * | 5/1993 | Thorp | B25B 21/00 137/625.68 |
| 5,293,901 | A * | 3/1994 | Guzzini | E03C 1/04 137/595 |
| 5,421,364 | A * | 6/1995 | Humpert | F16K 35/025 137/556 |
| 5,490,660 | A * | 2/1996 | Kamezawa | F16K 35/027 251/96 |
| 5,671,904 | A * | 9/1997 | Minutillo | F16K 35/027 16/441 |
| 5,771,878 | A * | 6/1998 | Lewis | G05G 1/02 126/42 |
| 5,983,938 | A * | 11/1999 | Bowers | C02F 1/003 137/625.17 |
| 5,992,457 | A * | 11/1999 | Humpert | F16K 31/605 137/625.17 |
| 6,029,699 | A * | 2/2000 | Granot | E03C 1/04 137/565.12 |
| 6,035,463 | A * | 3/2000 | Pawelzik | F16K 31/605 137/625.17 |
| 6,219,860 | B1 * | 4/2001 | Chang | E03C 1/0404 137/801 |
| 6,347,784 | B1 * | 2/2002 | Philipps-Liebich | F16K 35/025 251/107 |
| 6,394,127 | B1 * | 5/2002 | Creswell | B01D 35/04 137/544 |
| 6,517,720 | B1 * | 2/2003 | Aldred | B01D 35/04 137/545 |
| 6,641,727 | B1 * | 11/2003 | Aldred | B01D 35/04 210/232 |
| 6,802,341 | B1 * | 10/2004 | Johnson | F16K 31/605 137/636.2 |
| 6,926,035 | B2 * | 8/2005 | Ozagir | E03C 1/04 137/801 |
| 6,959,731 | B2 * | 11/2005 | Bartkus | F16K 11/0743 137/625.46 |
| 7,228,874 | B2 * | 6/2007 | Bolderheij | E03C 1/04 137/801 |
| 7,353,838 | B2 * | 4/2008 | Schmitt | B01D 61/10 137/216 |
| 7,445,024 | B2 * | 11/2008 | Paterson | E03C 1/057 137/549 |
| 7,487,797 | B2 * | 2/2009 | Di Nunzio | F16K 11/0787 137/625.17 |
| 7,717,131 | B2 * | 5/2010 | Creswell | F16K 3/10 137/625.46 |
| 7,743,788 | B2 * | 6/2010 | Schmitt | C02F 9/005 137/554 |
| 8,136,552 | B2 * | 3/2012 | Carignan | F16K 21/04 137/625.4 |
| 8,322,377 | B2 * | 12/2012 | Di Nunzio | F16K 11/078 137/625.41 |
| 8,418,515 | B2 * | 4/2013 | Yoon | F16K 35/06 137/385 |
| 8,613,293 | B2 * | 12/2013 | Bolgar | F16K 11/0743 137/597 |
| 8,695,635 | B1 * | 4/2014 | Wang | F16K 11/0787 137/597 |
| 2003/0102256 | A1 * | 6/2003 | Takagi | B01D 35/04 210/101 |
| 2004/0010848 | A1 * | 1/2004 | Esche | E03C 1/04 4/675 |
| 2006/0131228 | A1 * | 6/2006 | Truong | E03C 1/04 210/449 |
| 2006/0151034 | A1 * | 7/2006 | Klein | E03C 1/04 137/801 |
| 2006/0266424 | A1 * | 11/2006 | Filtness | E03C 1/0403 137/625.4 |
| 2007/0235091 | A1 * | 10/2007 | Granot | E03C 1/0404 137/597 |
| 2007/0246550 | A1 * | 10/2007 | Rodenbeck | E03C 1/057 236/12.11 |
| 2008/0178935 | A1 * | 7/2008 | Thomas | E03C 1/023 137/1 |
| 2009/0014379 | A1 * | 1/2009 | Kwan | B01D 35/04 210/411 |
| 2009/0242058 | A1 * | 10/2009 | Hansen | E03C 1/0403 137/801 |
| 2010/0193039 | A1 * | 8/2010 | Illingworth | E03C 1/04 137/112 |
| 2011/0030823 | A1 * | 2/2011 | Seal | E03C 1/04 137/603 |
| 2012/0018020 | A1 * | 1/2012 | Moore | E03C 1/0403 137/798 |
| 2012/0168000 | A1 * | 7/2012 | Gioira | E03C 1/0404 137/334 |
| 2012/0312401 | A1 * | 12/2012 | Gioira | F16L 41/023 137/603 |
| 2015/0068968 | A1 * | 3/2015 | Chiu | B01D 61/20 210/295 |
| 2016/0305557 | A1 * | 10/2016 | Liu | F16K 11/0743 |

* cited by examiner

FAUCET WITH TWO OUTLETS

BACKGROUND OF THE INVENTION

Field of the Invention

The present invention relates to a faucet and, more particularly, to a faucet with two outlets installed in kitchen.

Description of the Related Art

Now the space for people to live in their daily life is getting less. However, there are usually two types of faucets in the kitchen, one for filtered water and one for regular tap water. It takes more space in kitchen and inconvenience therefore arises.

Here are some conventional techniques disclosing different types of faucets. A first technique involves a single-knob controlled faucet with double water outlets. However, an outside filter and two pipes arranged side by side will occupy more counter space. A second technique discloses a dual purpose water purification faucet that provides an outside filter and two knobs arranged side by side and thus results in more complex operation. A third technique discloses a double water outlet faucet with filtering function, but it requires three control switches to result in more complex operation.

For economizing space and materials, how to combine the faucets for tap water and filtered water on a double-function faucet and use one knob of the double-function faucet is the subject to be explored.

SUMMARY OF THE INVENTION

In view of the problems and drawbacks of the conventional techniques, the objective of the present invention is to provide a faucet with two outlets ensuring multiple types of water output.

To achieve the foregoing objective, the faucet with two outlets includes a main body, an outlet pipe, a hot water inlet conduit, a cold water inlet conduit, a cold water conduit, a filtered water conduit and a switch member.

The main body has a top end and a bottom end. The top end serves as an extended portion of an outlet pipe, and the bottom end is connected with a hot water inlet conduit, a cold water inlet conduit, a cold water conduit and, a filtered water conduit. The filter water conduit is adapted to connect with an outlet of a water purification device.

The switch member is laterally formed on a peripheral wall of the main body and has a valve core, a knob, a button, a limit ring and a pin.

The valve core is rotated according to two types of water output modes to control filtered water or running water to flow out of the outlet pipe.

The knob is mounted in the main body.

The button is coupled to the knob by a spring connection, and is pressed down for the knob to be turned radially.

The limit ring is mounted on a periphery of the valve core.

The pin is axially mounted inside the limit ring and the knob.

The advantages of the faucet with two outlets reside in simple structure, novel shape, convenient operation, and integrated water output functions.

According to the foregoing description, the present invention has the advantages of a simplified structure to made two difference waterway gather to one inlet channel is convenience to used.

BRIEF DESCRIPTION OF THE DRAWINGS

The detailed description of the drawings particularly refers to the accompanying figures in which.

DETAILED DESCRIPTION OF THE INVENTION

As shown in FIGS. 1-9, the purpose, construction, features, functions and advantages of the present invention can be appreciated and understood more thoroughly through the following detailed description with reference to the attached drawings.

Figure 1:
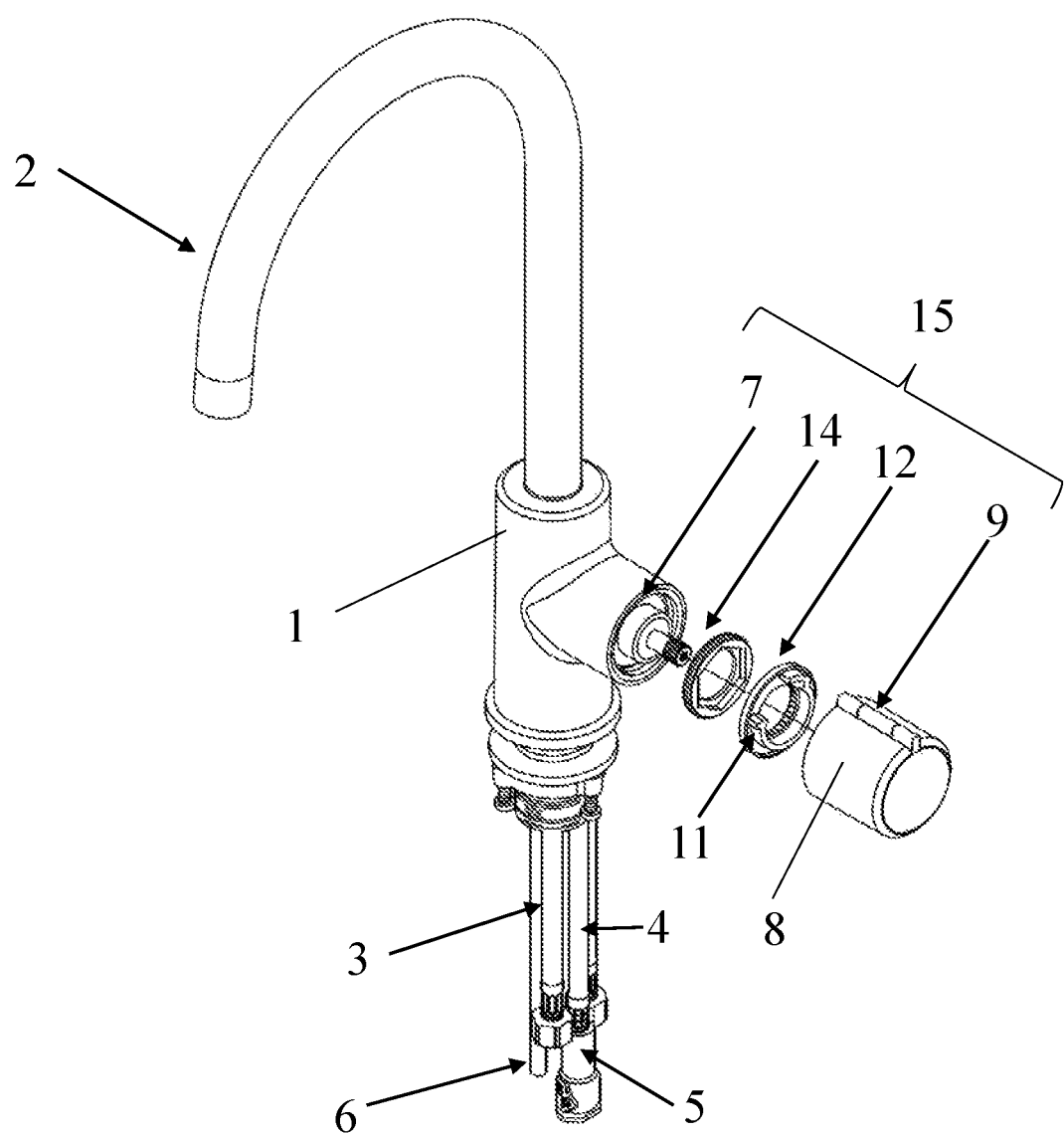
FIG. 1 is a partially exploded perspective view of a faucet with two outlets in accordance with the present invention.
Figure 2:
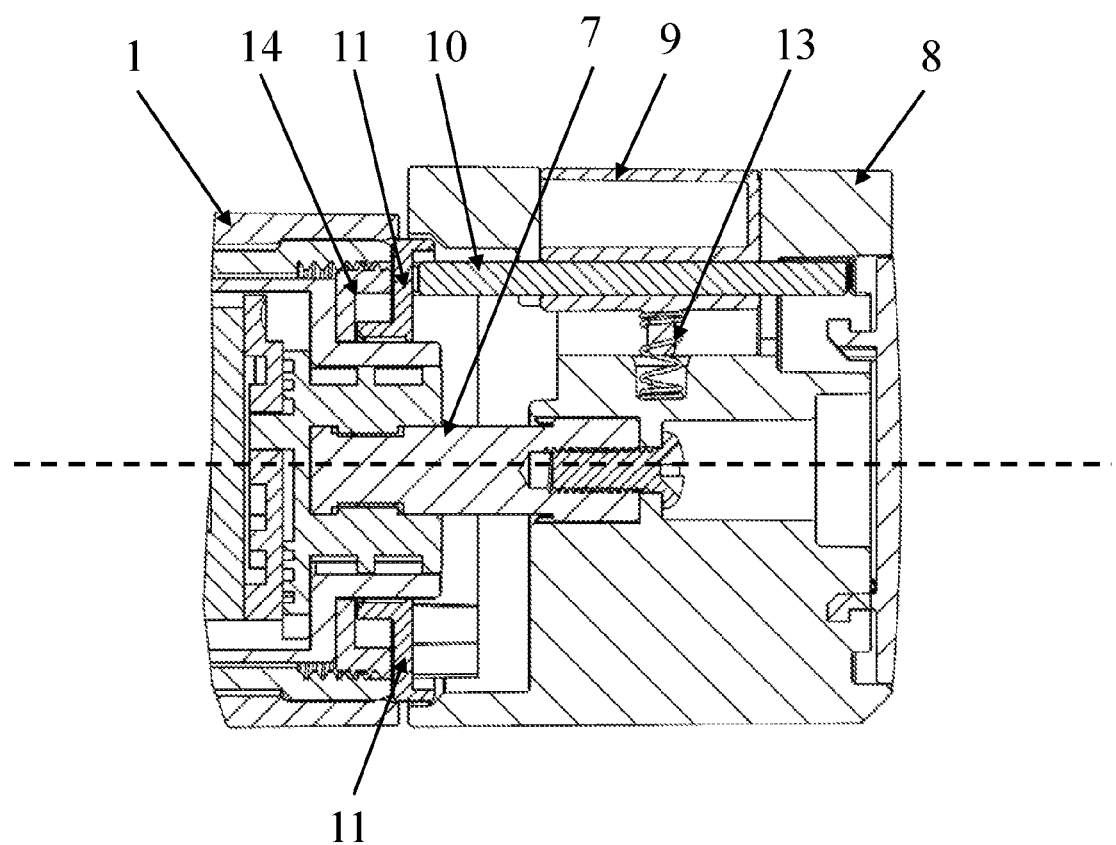
FIG. 2 is a cross-sectional view of a knob and a portion of a valve core of the faucet in FIG. 1.

With reference to FIGS. 1 and 2, a faucet with two outlets in accordance with the present invention includes a main body 1, an outlet pipe 2, a hot water inlet conduit 3, a cold water inlet conduit 4, a cold water outlet conduit 5, a filtered water conduit 6 and a switch member 15.

The main body 1 has a top end and a bottom end. The top end of the main body 1 serves as an extended portion of the outlet pipe 2. The outlet pipe 2 has an inner channel and an outer channel. The filtered water flows through the inner channel, and running water flows through the outer channel. The hot water inlet conduit 3, the cold water inlet conduit 4, the cold water outlet conduit 5 and the filtered water conduit 6 are connected with the bottom end of the main body 1. The filtered water inlet conduit 6 is connected with an outlet of a water purification device.

The switch member 15 is laterally formed on a peripheral wall of the main body 1 and includes a valve core 7, a knob 8, a limit ring 11, a restoring spring 13, a compression nut 14 and a button 9.

The valve core 7 is rotated according to two types of water output modes. The knob 8 is mounted on the main body 1, is securely connected with the limit ring 11 and the valve core 7, and serves for users to turn the valve core 7 radially according to the two types of water output modes of the faucet with two outlets. The limit ring 11 is connected with the compression nut 14 and is tightly mounted on a periphery of the valve core 7 through splined connection, and the compression nut 14 is connected with an inner wall of the main body 1 through threaded connection. The limit ring 11 has a bore 12 axially formed in the limit ring 11. A pin 10 is mounted inside the bore 12 and is securely mounted inside the knob 8. The button 9 is coupled to the knob 8 through the restoring spring 13 mounted between the knob 8 and the button 9.

With reference to FIGS. 3 to 6, the valve core 7 is mounted in the main body 1 and includes a housing 7-1, a base 7-2, a cold inlet hole 7-3, a hot inlet hole 7-4, a filtered hole 7-5, a mixed outlet hole 7-6, a rotary stem 7-7, a rotary lid 7-8, a rotary tile 7-9, a stationary tile 7-10, a first collar seal 7-16 and, a second collar seal 7-17.

Figure 4:
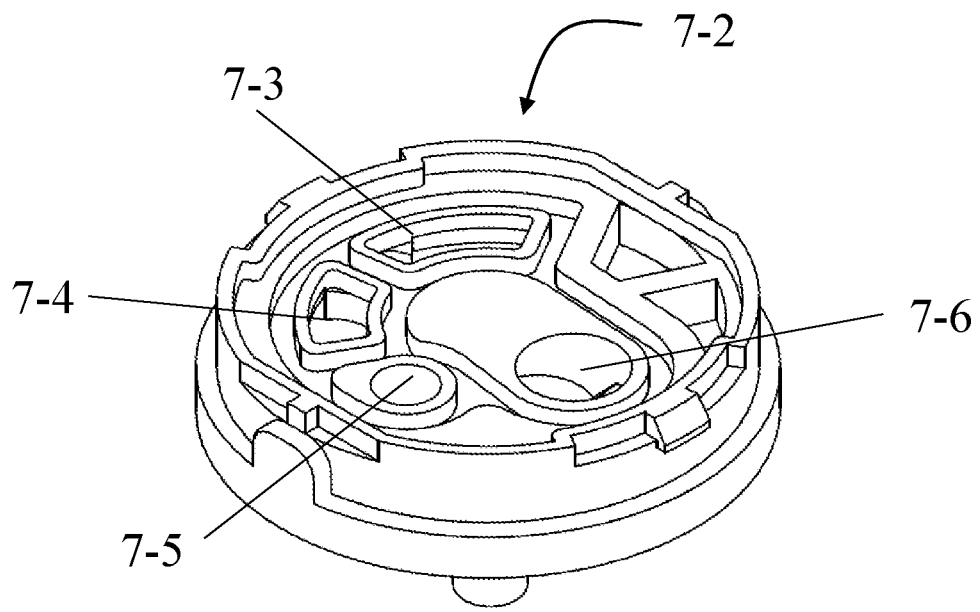
FIG. 4 is a perspective view of a base of the valve core in FIG. 3.

The housing 7-1 is cylindrical has a top opening 7-18 and a bottom opening 7-21. With reference to FIG. 4, the base 7-2 is mounted on a bottom of the housing 7-1, and the cold inlet hole 7-3, the hot inlet hole 7-4, the filtered hole 7-5 and the mixed outlet hole 7-6 are formed through the base 7-2. Tap water and hot water enters the valve core 7 through the cold inlet hole 7-3 and the hot inlet hole 7-4. The valve core 7 further has two outlets. Water passing through the filtered hole 7-5 further passes through the filtered water conduit 5 to enter the water purification device and the filtered water outputted from the water purification device then sequentially passes through the filtered water conduit 6 and the inner channel of the outlet pipe 2. Mixed water passing through the mixed outlet hole 7-6 further passes a water path inside the faucet to enter the outer channel of the outlet pipe 2. The rotary stem 7-7, the rotary lid 7-8, the rotary tile 7-9 and the stationary tile 7-10 are sequentially mounted inside the housing 7-1. The rotary stem 7-7 protrudes beyond a top opening 7-18 of the housing 7-1. The rotary stem 7-7 has a connecter 7-19 and multiple bumps 7-13. The connecter 7-19 is formed on an outer end of the rotary stem 7-7 and engages an inner portion the knob 8 through splined connection. The multiple bumps 7-13 are formed around and protrude radially from a perimeter of a bottom surface of the rotary stem 7-7 and are spaced apart from each other by gaps. The rotary lid 7-8 is mounted on the housing 7-1, is securely mounted in a bolt 7-14 and a spring 7-15, and the bolt 14 is connected with an inner wall of the housing.

Figure 3:
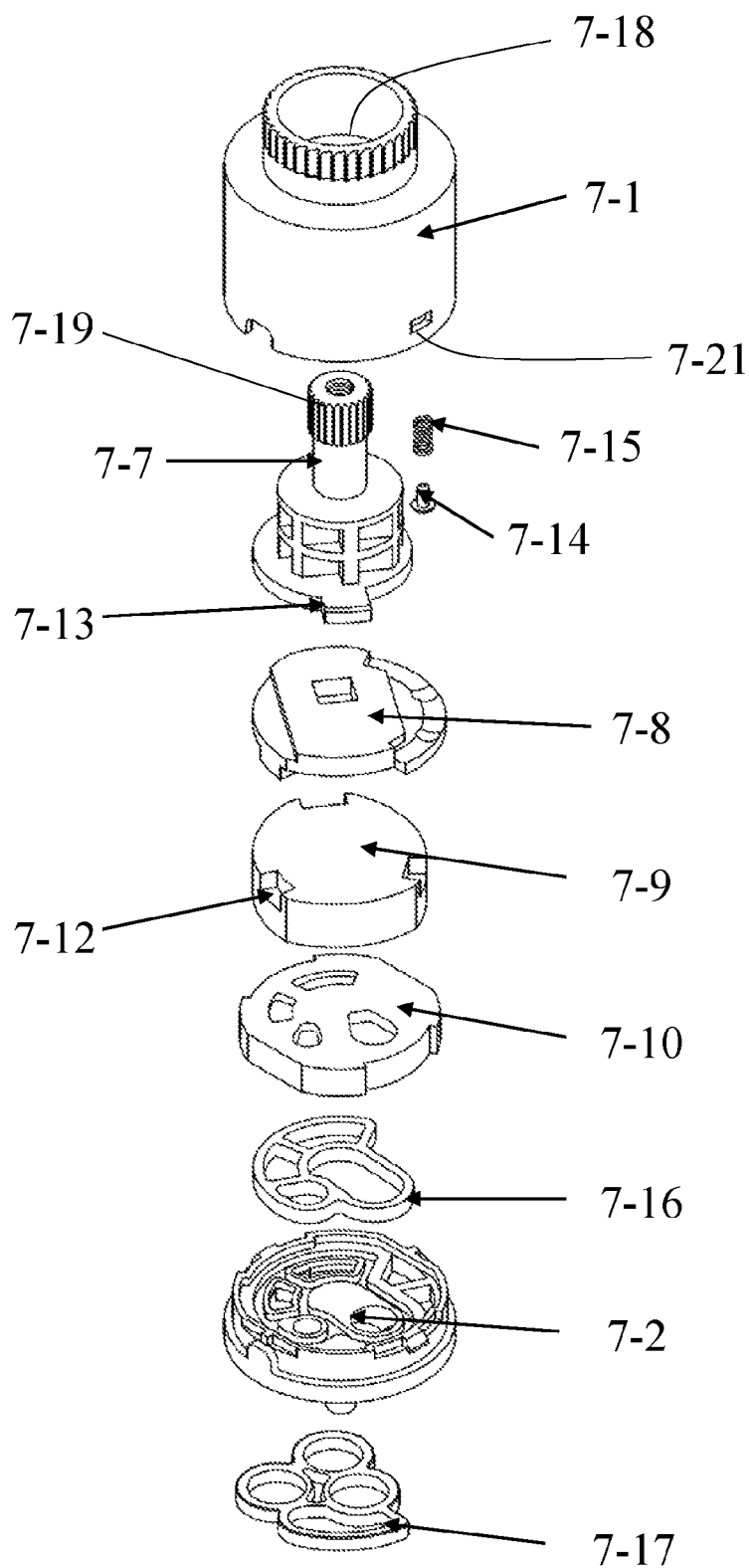
FIG. 3 is an exploded perspective view of the valve core in FIG. 2.
Figure 5:
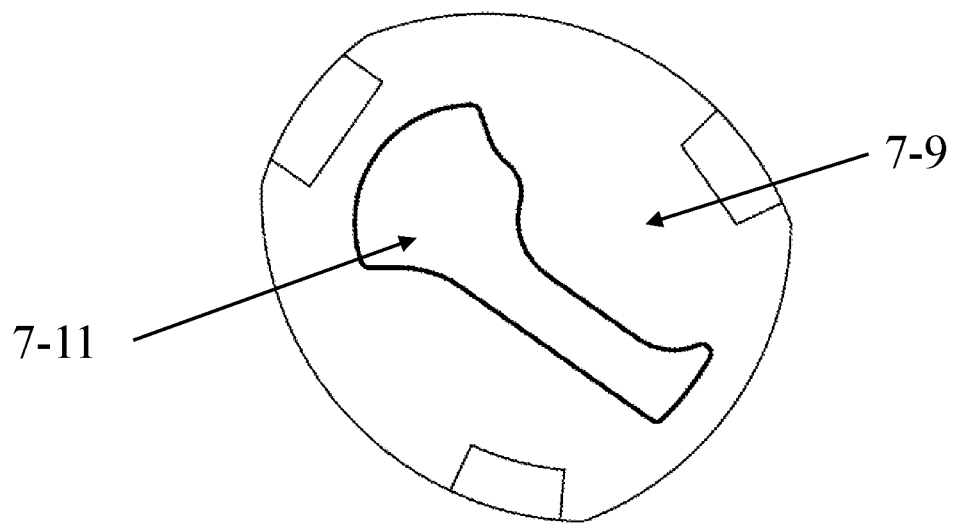
FIG. 5 is a perspective view of button end of a rotary tile in FIG. 3.

With reference to FIGS. 3 and 5, the rotary tile 7-9 has multiple notches 7-12 formed around an edge portion of a top surface of the rotary tile 7-9 and engaging the respective bumps 7-13 of the rotary stem 7-7, and the rotary lid 7-8 is mounted between the rotary stem 7-7 and the rotary tile 7-9. The rotary tile 7-9 further has a slot 7-11 centrally formed in an inner surface of the rotary tile 7-9.

The stationary tile 7-10 has four guide holes respectively communicating with the cold inlet hole, the hot inlet hole, the filtered hole and the mixed outlet hole of the base 7-2.

Figure 6:
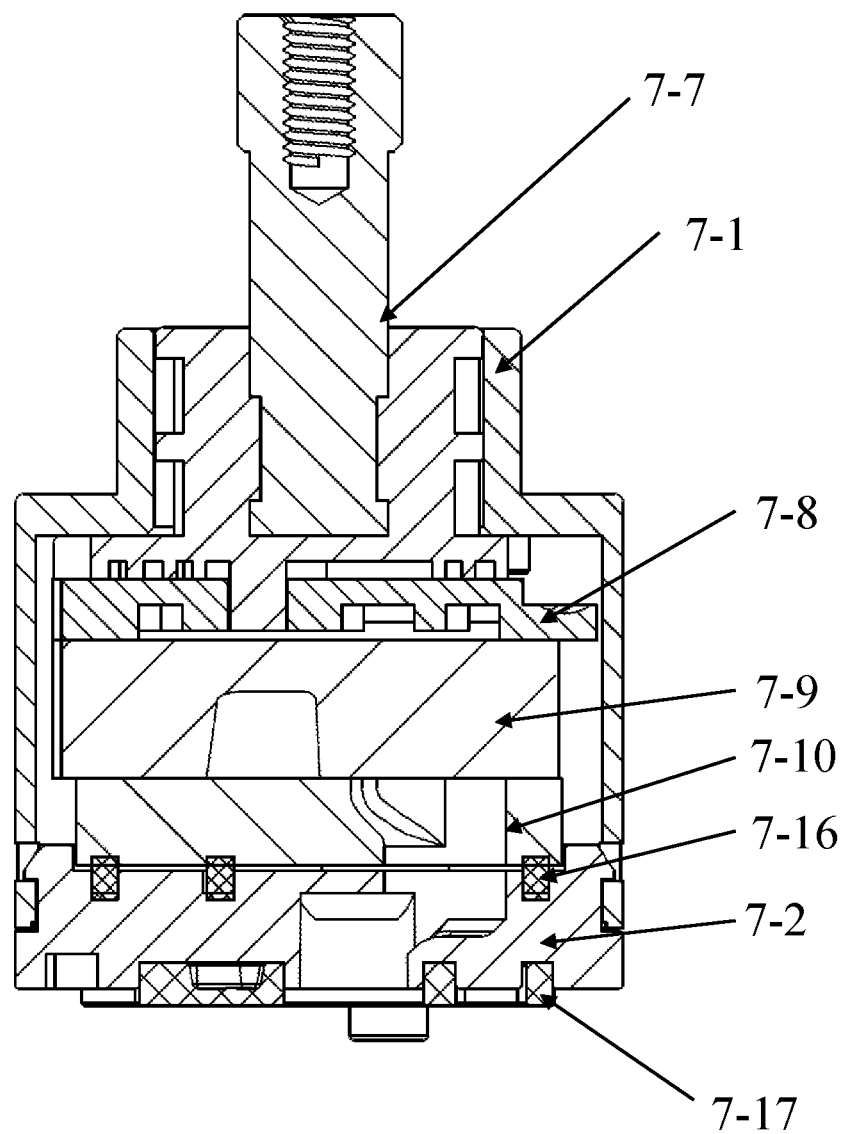
FIG. 6 is a cross-sectional view of the valve core in FIG. 3.

With reference to FIG. 6, a first collar seal 7-16 and a second collar seal 7-17 are respectively mounted in an outer surface and an inner surface of the base 7-2 to form hermetic seal among the stationary tile 7-10, the base 7-2 and the main body 1.

The cold inlet hole 7-3 selectively communicates with the hot water inlet conduit 3, the hot inlet hole 7-4 selectively communicates with the cold water inlet conduit 4, the filtered hole 7-5 selectively communicates with the cold water outlet conduit 5 and the mixed outlet hole 7-6 selectively communicates with a switch pipe (not show) by turning the switch member 15.

The faucet with two outlets has two waterways for two different kinds of water to flow through the same outlet pipe 2.

The operation of filtered water is described as follow. Water to be filtered enters the cold inlet hole 7-3 of the valve core 7 through the hot water inlet conduit 3, flows in the slot 7-11 of the rotary tile 7-9 and flows through the filtered hole 7-5 of the base 7-2 into the cold water outlet conduit 5. The cold water outlet conduit 5 is connected with a water purification device that is mounted outside the faucet with two outlets. Water to be filtered enters the water purification device through the cold water conduit 5, and water filtered by the water purification device flows out of the water purification device to enter the filtered water conduit 6, the filtered water conduit 6 communicates with inner layer of the outlet pipe 2, and the filtered water further flows through the inner channel of the outlet pipe 2.

The operation of mixed water is described as follow. Running water and hot water respectively enter the cold inlet hole 7-3 and the hot inlet hole 7-4 of the valve core 7 through the hot water inlet conduit 3 and the cold water inlet conduit 4, and then cold and hot water flow to the mixed outlet hole 7-6 through the slot 7-11 of the rotary tile 7-9, and then flows through the outer channel of the outlet pipe 2.

To achieve arbitrary switch of different kinds of water, the operation is described as follow. With reference FIG. 7-9, when the button 9 is push down to press the spring 13, the knob 8 is rotated to drive the rotary tile 7-9 to rotate for the cold inlet hole 7-3, the hot inlet hole 7-4, the filtered hole 7-5, and the mixed outlet hole 7-6 and the recess 7-11 to coincide with each other or to be misaligned, such that water can or cannot pass through the outlet pipe 2.

Figure 7A:
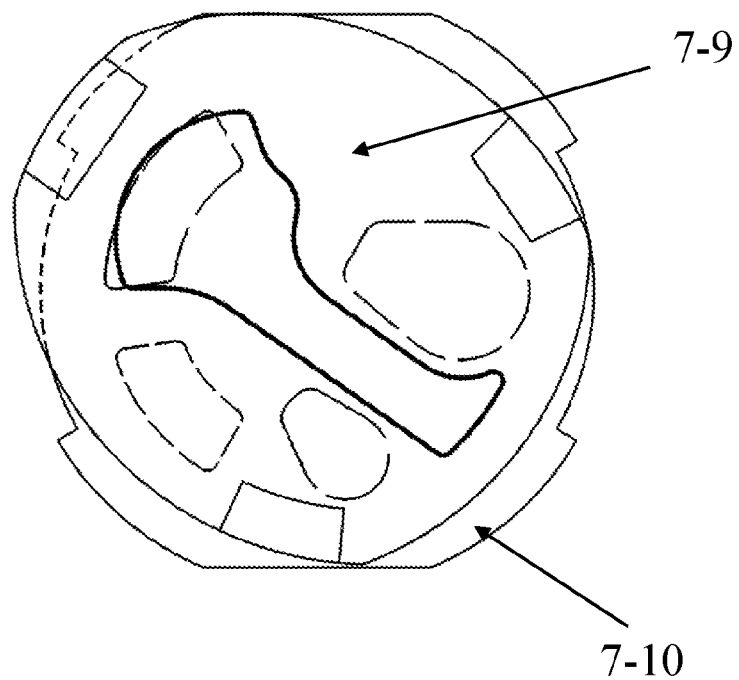
FIG. 7A-E are operational views of the rotary tile and a stationary tile in FIG. 3

FIG. 7A shows a closed position. At the closed position, a portion of the slot 7-11 of the rotary tile 7-9 communicates with the cold inlet hole 7-3 while the remaining portion of the recess 7-11 fails to communicate with none of the cold inlet hole 7-3, the hot inlet hole 7-4, the filtered hole 7-5, and the mixed outlet hole 7-6. Therefore, no water will not flow out.

Figure 7B:
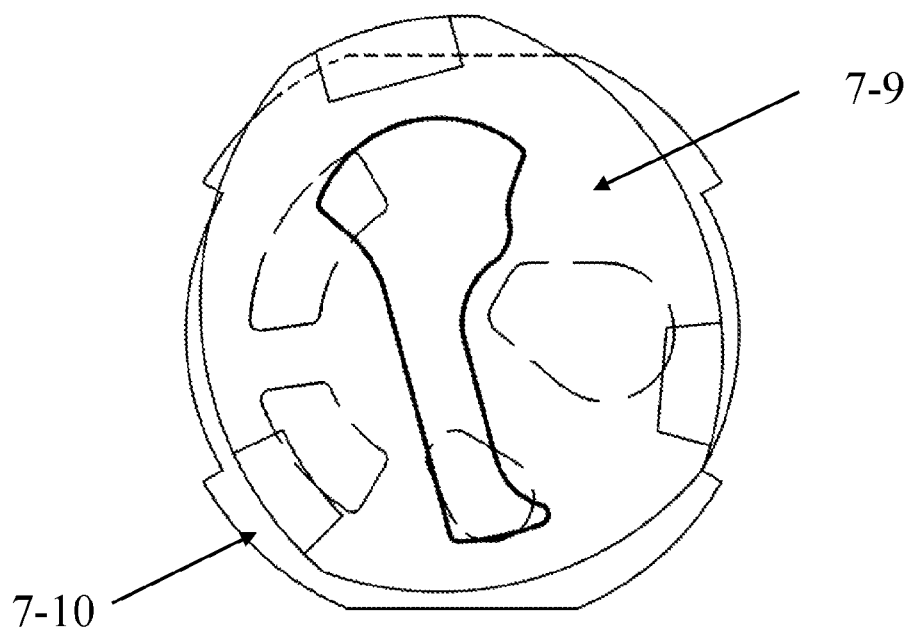

FIG. 7B shows a filtered water position. At the filtered water position, the knob 8 is turned 35° in a clockwise direction, a portion of the slot 7-11 communicates with the cold inlet hole 7-3 while another portion of the slot 7-11 communicates with the filtered hole 7-5. Therefore, water to be filtered flows to the purification device through the filtered water conduit 6 and water filtered by the water purification device flows through the inner channel of the outlet pipe 2.

Figure 7C:
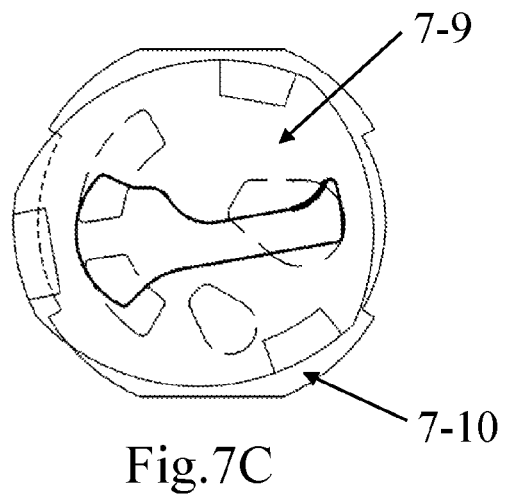

FIG. 7C shows a cold water position. At the cold water position, the knob 8 is turned 15° in a counterclockwise direction, A portion of the slot 7-11 communicates with the cold inlet hole 7-3 and another portion of the slot 7-11 communicates with the mixed outlet hole 7-6. Therefore, cold water enters the cold inlet hole 7-3 through the cold water inlet conduit 4 and then flows to the mixed outlet hole 7-6 through the slot 7-11, and further flows out of the outer channel of the outlet pipe 2.

Figure 7D:
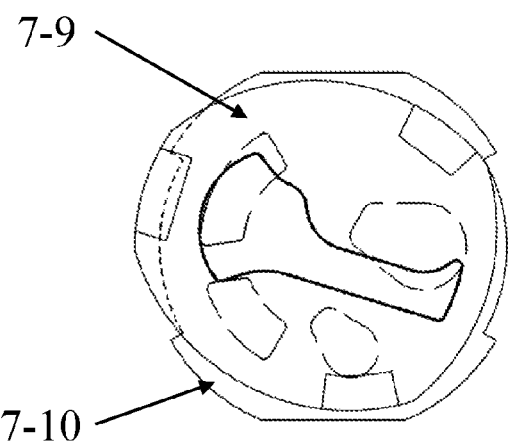

FIG. 7D shows a warm water position (half cold and half hot) At the warm water position, the knob 8 is turned 45° in the counterclockwise direction. A portion of the slot 7-11 communicates with the cold inlet hole 7-3 and the hot inlet hole 7-4, and another portion of the slot 7-11 communicates with the mixed outlet hole 7-6. Therefore, hot water and cold water respectively flows to the hot inlet hole 7-4 and the cold inlet hole 7-3 of the valve core 7 through the hot water inlet conduit 3 and the cold water inlet conduit 4 then flows to the mixed outlet hole 7-6 through the slot 7-11, and further flows out of the outer channel of the outlet pipe 2.

Figure 7E:
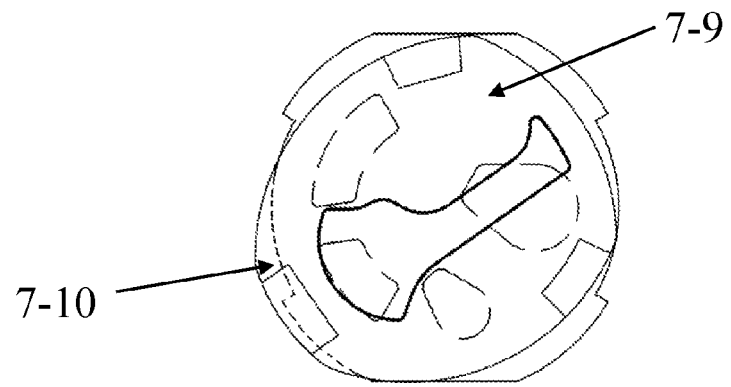
Figure 8:
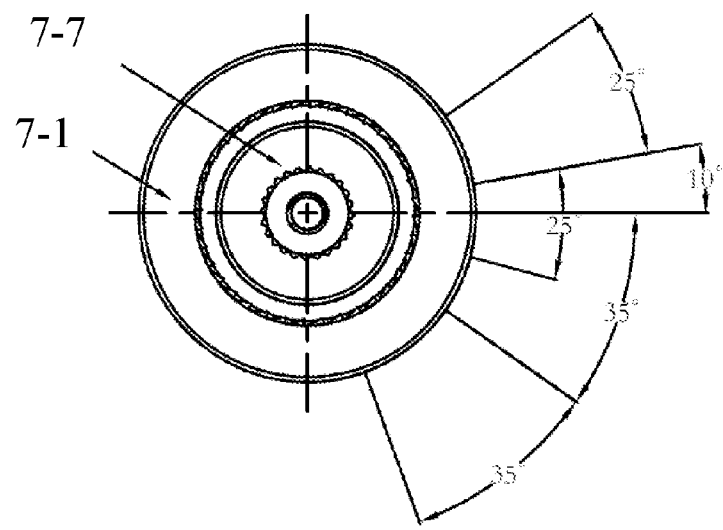
FIG. 8 is an operational view illustrating five rotation angles between the rotary tile and the stationary tile of the valve core in FIG. 3.
Figure 9:
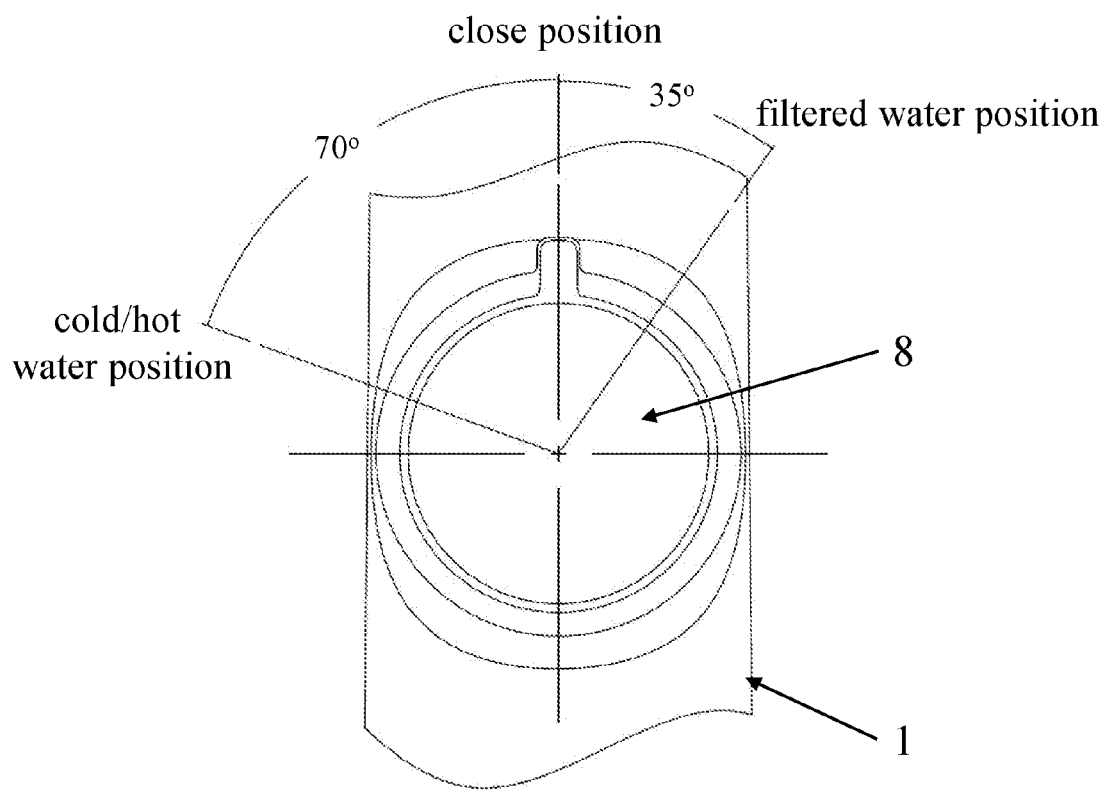
FIG. 9 is an operational side view illustrating the rotation positions of the knob for different water output modes of the faucet in FIG. 1.

FIG. 7E shows a hot water position. At the hot water position, the knob 8 is turned 70° in the counterclockwise direction. A portion of the slot 7-11 communicates with the hot inlet hole 7-4, and another portion of the slot 7-11 communicates with the mixed outlet hole 7-6. Therefore, hot water enters the cold inlet hole 7-4 of the valve core 7 through the hot water inlet conduit 3, then flows to the mixed outlet hole 7-6 through the slot 7-11, and further flows out of the outer channel of the outlet pipe 2.

The invention claimed is:
1. A faucet comprising:
a main body having a top end and a bottom end, wherein the top end serves as an extended portion of an outlet pipe, and the bottom end is connected with a hot water inlet conduit, a cold water inlet conduit, a cold water conduit and a filtered water conduit, wherein the filter water conduit is adapted to connect with an outlet of a water purification device; and a switch member laterally formed on a peripheral wall of the main body, and having:
a valve core rotated according to two types of water output modes to control filtered water or running water to flow out of the outlet pipe;
a knob mounted to the main body;
a button coupled to the knob by a spring connection, and pressed down for the knob to be turned radially;
a limit ring mounted on a periphery of the valve core; and
a pin axially mounted inside the limit ring and the knob, wherein the limit ring has a bore axially formed in the limit ring, and the pin mounted inside the bore and securely mounted inside the knob.

2. A faucet comprising:
a main body having a top end and a bottom end, wherein the top end serves as an extended portion of an outlet pipe, and the bottom end is connected with a hot water inlet conduit, a cold water inlet conduit, a cold water conduit and, a filtered water conduit, wherein the filter water conduit is adapted to connect with an outlet of a water purification device; and
a switch member laterally formed on a peripheral wall of the main body, and having:
a valve core rotated according to two types of water output modes to control filtered water or running water to flow out of the outlet pipe;
a knob mounted to the main body;
a button coupled to the knob by a spring connection, and pressed down for the knob to be turned radially;
a limit ring mounted on a periphery of the valve core; and
a pin axially mounted inside the limit ring and the knob, wherein the valve core has:
  a housing being cylindrical and having a top opening and a bottom opening;
  a rotary stem mounted inside the housing, protruding beyond the top opening of the housing, and having:
    a connector formed on an outer end of the rotary stem and engaging an inner portion of the knob through splined connection; and
    multiple bumps formed around and protruding radially from a perimeter of a bottom surface of the rotary stem, and spaced apart from each other by gaps;
  a rotary tile mounted inside the housing and having:
    a slot centrally formed in an inner surface of the rotary tile;
  a rotary lid mounted between the rotary stem and the rotary tile;
  a stationary tile having four guide holes; and
  a base mounted on a bottom of the housing and having a cold inlet hole, a hot inlet hole, a filtered hole, and a mixed outlet hole formed through the base and communicating with the four guide holes of the stationary tile.

3. The faucet as claimed in claim 2, wherein a bolt and a spring are mounted in an inner wall of the housing to connected with the rotary lid.

4. The faucet as claimed in claim 2, wherein a first collar seal and a second collar seal are respectively mounted in an outer surface and an inner surface of the base to formed hermetic seal among the stationary tile, the main body and the base.

* * * * *